April 11, 1967 S. E. WOLFE 3,313,577
METHOD AND APPARATUS FOR TRANSPORTING SLURRIES
Filed March 15, 1965

INVENTOR.
S. EDMUND WOLFE
BY
Arne J. Fors
Agent

United States Patent Office 3,313,577
Patented Apr. 11, 1967

3,313,577
METHOD AND APPARATUS FOR TRANSPORTING SLURRIES
Samuel Edmund Wolfe, R.R. 1, Streetsville, Ontario, Canada
Filed Mar. 15, 1965, Ser. No. 439,573
6 Claims. (Cl. 302—64)

This invention relates to a method and apparatus for transporting slurries in pipelines and is particularly directed to a method and apparatus for maintaining the solid constituents of liquid-solid mixtures in a substantially dispersed suspension.

The transportation of liquid-solid slurries, i.e. slurries consisting of various sized solid particles in a fluid medium, through pipelines is well known. However, conventional systems for transporting slurries having large solid particles require high flow velocities under turbulent flow conditions with attendant high power consumption to maintain the solids in suspension. Also, conventional systems suffer from the inherent disadvantage of the solid constituents of the slurry, settling to the bottom of the pipeline as a sediment, collecting to plug the pipeline under low velocity conditions or during and immediately after a shut-down.

The use of helical ribs disposed within pipelines for minimizing the above disadvantages is known in the art. However, the use of helical ribs heretofore has not met with commercial acceptance and use because of fabrication problems and inefficiency of operation. For example, known techniques provide for a very low angle of spirality relative to the long axis of the pipe which does not provide for effective rotation of slurries at desirable operating velocities. Thus, the incorporation of a low-angle helix in a pipe proved ineffective and did not warrant the capital expenses.

I have discovered that the incorporation of at least one continuous helical rib within a pipe whereby the rib abuts the inner wall of the pipeline and extends inwardly a short distance into the conduit defining an angle of from about 35° to about 50° relative to the longitudinal axis of the conduit and, as the conduit diameter changes, having a predetermined maximum linear rib spacing provides unexpected advantages in the transportation of liquid-solid slurries through pipelines while substantially obviating the above problems. The periphery of the slurry, normally travelling slowly relative to the flow rate at the longitudinal axis of the pipeline, is rotated continuously relative to the axis of the pipe thereby providing a rotating layer of liquid which picks up settled solids, carries said solids up a side of the pipe, and drops the solids into the fast moving axially travelling body of the slurry to effectively maintain the coarse solid constituents of the slurry in suspension with a minimum of energy consumption.

It is, therefore, an important object of the present invention to provide a system for maintaining liquid-solid slurries in a suspensoid condition.

It is another important object of the present invention to provide an apparatus and method for maintaining the solid constituents of a slurry in suspension under a variety of flow conditions and thereby minimize the hazard of plugging while effectively reducing power requirements.

Another object of the present invention is the provision of a system which is operative for transporting liquid-solid slurries through pipelines over a wide range of pipe diameters and slurry flow rates.

Another object of the invention is the provision of a system whereby the flow can be stopped and restarted without the hazard of plugging.

And another object of the present invention is the provision of a system which permits the presence in the slurry of entrained gases such as air without the normally attendant hazard of vapour locks.

And still another important object of the present invention is the provision of a pipeline and helix according to the present invention which can be readily manufactured and utilized on a commercial scale.

These and other objects of the present invention, and the manner in which they can be attained, will become apparent from the following detailed description of the drawing, in which.

Like reference characters refer to like parts throughout the description of the drawing.

Figure 1:
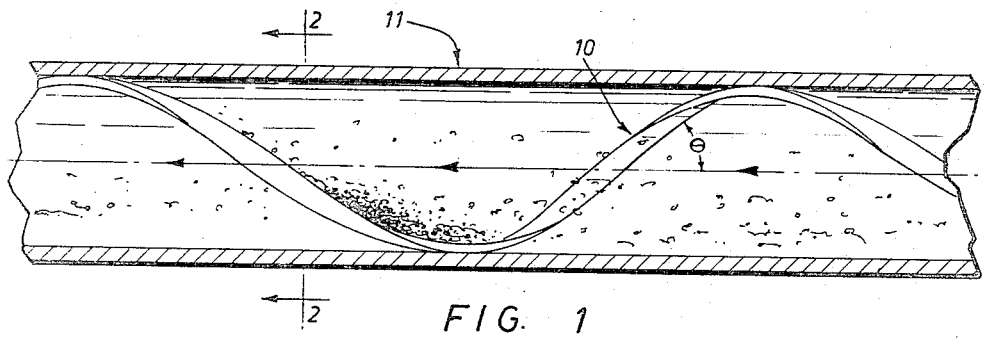
FIGURE 1 is a side elevation of a pipeline having the improvement of the present invention illustrating the flow of a liquid-solid slurry.
Figure 2:
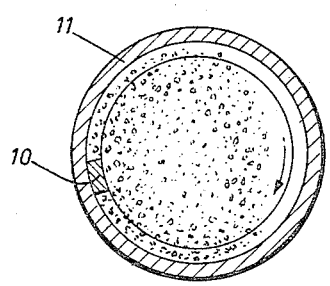
FIGURE 2 is a transverse section taken along line 2—2 of FIGURE 1 illustrating the distribution of coarse solids in the slurry.

With reference to the drawing, FIGURES 1 and 2 illustrate an embodiment of the present invention wherein a peripheral rib 10 is in abutting engagement with the inner periphery of a pipe indicated by numeral 11 to form a continuous helix along the inner wall of said pipe. Each rib 10 preferably extends a short distance into the conduit formed by the wall of the pipe such as, for example, one-quarter inch for pipe up to about 6 inches in diameter and three-eighths to one-half inch or larger for pipe greater than 6 inches in diameter. The rib can be formed by inserting the helix wound in coiled form into the pipe, extending the helix within the pipe to obtain the desired position and utilizing the resiliency of the helix to permit the helix to expand into engaging abutment with the inner pipe wall. The rib in the foregoing embodiment preferably is formed from a hard resilient material.

Figure 4:
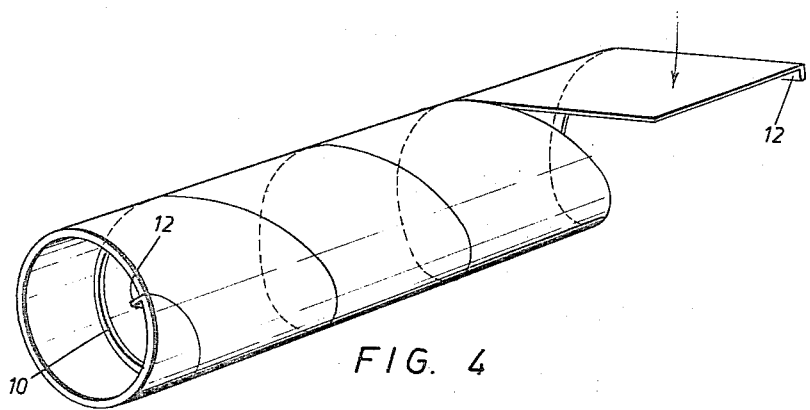
FIGURE 4 is a perspective view of one further embodiment of the present invention.

It may be preferred to rigidly secure the rib 10 to the inner pipe wall. This can be accomplished by fastening the rib to the inner pipe wall by spot welding or by forming the rib integral with the pipe. For example, a flange 12 can be formed along one edge of a strip of sheet metal and said strip, or strips, helically wound about a mandrel such that said flange 12 forms a continuous rib 10, as illustrated most clearly in FIGURE 4. A pipe having an internal helical rib 10 can also be fabricated by extruding a metal such as aluminum or a plastic material such as polyurethane or polyvinyl chloride in the desired rib shape pitch and spacing.

The pitch of each of helical ribs 10 is controlled by the angle defined between the rib and the longitudinal axis of the pipe such that each rib defines an angle of from about 35° to about 50° relative to said axis, angle $\theta$ in FIGURE 1, an angle of from about 40° to about 45° being preferred to rotate a layer of slurry about the axially flowing main body of slurry. The above range has been found to provide optimum lifting action to elevate solids dropping to the bottom of the pipe back into the slurry body. To ensure a continuous lifting effect along the length of the pipeline, the spacing of ribs 10 should be no greater than about 6 inches at a flow velocity below about 6 feet per second. For pipe having a helix defining an angle of about 45° relative to the axis of the pipe, the helix pitch is about 4.5 inches for 2 inch diameter pipe; 5.6 inches for 2.5 inch diameter pipe; 6.7 inches for 3 inch diameter pipe; and 8.9 inches for 4 inch diameter pipe. Thus, 3 inch diameter pipe should have two parallel helices spaced about 3.4 inches apart and 4 inch diameter pipe should have two parallel helices spaced about 4.5 inches apart.

It will be evident from the foregoing description that the angle defined by the helix will determine the effective pitch of the helix rib and, in pipe up to 2.5 inches in diameter, a single helix is employed whereas in a pipe 3 inches and greater in diameter, at least two helices are employed.

Although it will be understood that the present invention is free of hypothetical considerations, it is believed the improved flow characteristics provided by the present apparatus arises from the creation of a continuously rotating layer of slurry flowing about the periphery of a main body of flowing slurry. In that the main flow of slurry is not impeded or obstructed by the helical rib or ribs, energy requirements for effecting rotation of the peripheral layer uplifting settled solids for discharge into the axially flowing main body of the slurry are minimal and the carrying power of the slurry is enhanced permitting the transport of solids in a liquid under low velocity conditions not heretofore considered possible.

Figure 3:
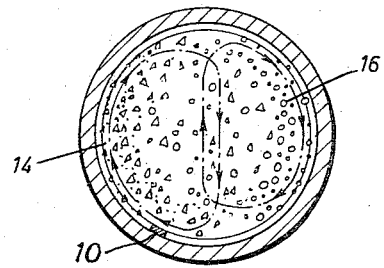
FIGURE 3 is a section through a pipeline having the improvement of the present invention illustrating the distribution of an entrained gas with solids in the slurry.

FIGURES 1 and 2 illustrate the observed distribution of coarse solids within a pipeline having the improvement of the present invention. Helix 10 rotates the periphery of the slurry in a clock-wise direction as viewed in FIGURE 2 such that solids 14 at the bottom of the pipe are carried up the side wall of the pipe to cascade downwardly under gravity into the central portion of the slurry. FIGURE 3 illustrates the observed effect of the presence of bubbles 16 of a gas such as air in the slurry whereby bubbles 16 rise to the upper periphery of the body of the slurry, are captured by the peripheral layer, and are carried clockwise downwardly to rise into the central portion of the slurry. The rising bubbles moving counter-current to the falling solids form a couple which promotes suspension of the solids. It will be evident that the rotation of a slurry layer obviates the accumulation of a gas in pockets by effectively sweeping the gas into the slurry body and the inter-action of the rising gas bubbles on the descending solids promotes the maintenance of a dispersed slurry. The presence of gas bubbles in a slurry can be advantageous in promoting liquid-solid-gas chemical reactions or maintaining neutral, reducing or oxidizing atmospheres. The presence of bubbles of a gas in a slurry can also be advantageous in providing resiliency to the liquid medium to minimize the harmful effects of water hammer.

The present invention provides a number of important advantages. The solid constituents of slurries can be maintained in suspension with minimal power requirements under low velocity flow conditions not heretofore considered feasible. Plugging of pipelines by accumulation of solids due to low flow velocities and shut-downs are obviated and abrasive wear in the pipeline is minimized. The flow can be stopped and started again as the rotating fluid picks up the settled solid particles. The presence of a gas as bubbles, which normally causes vapour locks, provides resilience to the liquid medium and can be of advantage in maintaining the solid constituents of the slurry under a desired environment or in promoting chemical reactions.

It will be understood, of course, that modifications can be made in the preferred embodiment of the invention described and illustrated herein without departing from the scope of the invention as defined by the appended claims.

What I claim as new and desire to protect by Letters Patent of the United States is:

1. An improved pipe for transporting liquid-solid slurries in a pipeline which comprises at least one circumferentially complete helical rib formed in said pipe at least about every 6 inches along the length of the pipe projecting inwardly from the inner pipe wall at least one-quarter inch for pipe up to about six inches in diameter and at least three-eights inch for pipe larger than about six inches in diameter, said rib defining an angle of from 35° to about 50° relative to the axis of the pipe.

2. In a pipe as claimed in claim 1, said rib defining an angle of from about 40° to about 45° relative to the axis of the pipe.

3. In a pipe as claimed in claim 2, said rib formed integral with said pipe.

4. In a pipe as claimed in claim 2, said rib formed of a resilient material engaging said pipe in tight-fitting abutting relationship.

5. An improved pipe, for the transportation of a slurry, which comprises at least one helical rib formed adjacent the wall of said pipe having a lineal rib spacing of not more than about 6 inches along the length of the pipe and defining an angle of from 35° to about 50° relative to the longitudinal axis of the pipe.

6. In a pipe as claimed in claim 5, means for adding a gas to said pipe for the formation of bubbles of said gas at the slurry pressure.

References Cited by the Examiner

UNITED STATES PATENTS

| | | | |
|---|---|---|---|
| 875,414 | 12/1907 | Dickson et al. | 302—14 |
| 1,329,967 | 2/1920 | Greenstreet | 302—14 |
| 1,451,272 | 4/1923 | Robinson | 302—14 |
| 1,662,178 | 3/1928 | Yuille | 302—14 |
| 1,777,782 | 10/1930 | Bundy | 302—64 |

ANDRES H. NIELSEN, *Primary Examiner.*